US009729081B1

(12) United States Patent
Zou et al.

(10) Patent No.: US 9,729,081 B1
(45) Date of Patent: Aug. 8, 2017

(54) POWERED DEVICE HAVING SEMI-ACTIVE BRIDGE

(71) Applicant: Maxim Integrated Products, Inc., San Jose, CA (US)

(72) Inventors: Gaoling Zou, San Jose, CA (US); Thong A. Huynh, Fremont, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 273 days.

(21) Appl. No.: 13/739,113

(22) Filed: Jan. 11, 2013

Related U.S. Application Data (60) Provisional application No. 61/586,555, filed on Jan. 13, 2012, provisional application No. 61/586,608, filed on Jan. 13, 2012.

(51) Int. Cl.
*H02M 7/06* (2006.01)
*H02M 7/219* (2006.01)
*H02M 7/217* (2006.01)

(52) U.S. Cl.
CPC ............ *H02M 7/219* (2013.01); *H02M 7/066* (2013.01); *H02M 7/217* (2013.01); *H02M 2007/2195* (2013.01)

(58) Field of Classification Search
CPC ................. H02M 7/217; H02M 7/219; H02M 2007/2195; H02M 7/06; H02M 7/066
USPC ...................... 363/67, 69, 70, 125, 126, 127
See application file for complete search history.

(56) References Cited

U.S. PATENT DOCUMENTS

| 5,510,972 A * | 4/1996 | Wong ............................ 363/127 |
| 6,366,485 B1 * | 4/2002 | Fujisawa ....................... 363/127 |
| 6,411,535 B1 * | 6/2002 | Roux .................. H02M 1/4225 363/124 |
| 6,563,726 B1 * | 5/2003 | Hirst ............................ 363/127 |
| 7,164,591 B2 * | 1/2007 | Soldano ............. H02M 1/4225 363/89 |
| 2004/0047167 A1 * | 3/2004 | Prasad et al. ................. 363/125 |
| 2007/0171690 A1 * | 7/2007 | Apfel ........................... 363/127 |
| 2008/0291699 A1 * | 11/2008 | Sells .................... H02M 7/219 363/17 |
| 2010/0046264 A1 * | 2/2010 | Ho et al. ....................... 363/127 |
| 2010/0153751 A1 * | 6/2010 | Tseng et al. .................. 713/300 |
| 2010/0188876 A1 * | 7/2010 | Garrity et al. ................ 363/127 |
| 2011/0044081 A1 * | 2/2011 | Lu ................................ 363/127 |
| 2011/0075460 A1 * | 3/2011 | Sells ...................... H02M 1/08 363/127 |
| 2011/0134673 A1 * | 6/2011 | Ho et al. ....................... 363/127 |
| 2011/0141782 A1 * | 6/2011 | Sells .................... H02M 7/219 363/127 |
| 2011/0199799 A1 * | 8/2011 | Hui et al. ..................... 363/127 |

(Continued)

*Primary Examiner* — Fred E Finch, III
(74) *Attorney, Agent, or Firm* — Advent, LLP (57) ABSTRACT

A semi-active bridge for furnishing voltage of a correct polarity to a powered device in a Power over Ethernet (PoE) network is disclosed. In one or more implementations, the semi-active bridge includes a diode having an anode portion and a cathode portion. The anode portion of the diode is connected to an input terminal, and the cathode portion of the diode is connected to an output terminal. The semi-active bridge also includes an active transistor device having a source region and a drain region. The drain region of the active transistor device is connected to the input terminal, and the source region of the active transistor device is connected to the output terminal.

9 Claims, 5 Drawing Sheets

(56) References Cited

U.S. PATENT DOCUMENTS

| | | | |
|---|---|---|---|
| 2012/0218668 A1* | 8/2012 | Kidger et al. | 361/18 |
| 2012/0242390 A1* | 9/2012 | Montalbo | H02M 7/219 327/324 |
| 2013/0076146 A1* | 3/2013 | Maniktala | 307/80 |
| 2014/0085948 A1* | 3/2014 | Huynh | H02M 7/219 363/80 |
| 2014/0177305 A1* | 6/2014 | Irish | 363/127 |
| 2014/0268956 A1* | 9/2014 | Teren | H02M 7/219 363/89 |
| 2016/0172996 A1* | 6/2016 | Matsui | H02M 1/4233 363/89 |

\* cited by examiner

POWERED DEVICE HAVING SEMI-ACTIVE BRIDGE

CROSS-REFERENCE TO RELATED APPLICATIONS

The present application claims the benefit under 35 U.S.C. §119(e) of U.S. Provisional Application Ser. No. 61/586,555, entitled POWERED DEVICE HAVING SEMI-ACTIVE BRIDGE, filed on Jan. 13, 2012, and U.S. Provisional Application Ser. No. 61/586,608, entitled POWERED DEVICE HAVING SEMI-ACTIVE BRIDGE, filed on Jan. 13, 2012. U.S. Provisional Application Ser. Nos. 61/586,555 and 61/586,608 are herein incorporated by reference in their entirety.

BACKGROUND

Power over Ethernet (PoE) technology describes passing electrical power, along with data, on Ethernet cabling. PoE technology is typically regulated by multiple IEEE standards. Power is supplied in common mode over two or more of the differential pairs of wires found in the Ethernet cables and comes from a power supply within a PoE-enabled networking device such as an Ethernet switch, or can be injected into a cable run with a midspan power supply. The basic elements of a PoE system are: 1) Power Sourcing Equipment (PSE), a device such as a switch that provides ("sources") power on the Ethernet cable, and 2) a powered device powered by a PSE that consumes energy from the PSE. Examples of powered devices include wireless access points, Internet Protocol (IP) telephones, and IP cameras.

SUMMARY

A semi-active bridge for furnishing voltage of a correct polarity to a powered device in a Power over Ethernet (PoE) network is disclosed. In one or more implementations, each phase of the semi-active bridge includes a diode having an anode portion and a cathode portion. The anode portion of the diode is connected to an input terminal, and the cathode portion of the diode is connected to an output terminal. Each phase of the semi-active bridge also includes an active transistor (FET) device having a source region and a drain region. The drain region of the active transistor device is connected to the input terminal, and the source region of the active transistor device is connected to the output terminal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figure.

DETAILED DESCRIPTION

Overview

Power over Ethernet networks are configured to provide power, as well as data, to a powered device through Ethernet cables. Ethernet cables include modular connectors that interface with the powered devices, which furnish an electrical connection between the network and the powered devices.

The powered device typically includes one or more power bridge rectifiers that are configured to provide voltage of the correct polarity to the powered device (e.g., bridge rectifiers provide same output polarity for either input polarity). For example, the bridge rectifier may receive negative forty-eight volts (−48 V) from the PoE network. The bridge rectifier is configured to provide about forty-eight volts of the correct polarity to the powered device to power the powered device.

Two types of bridge rectifiers include the diode bridge and the active field-effect-transistor (FET) bridge. Diode bridges are popular bridge rectifiers due to the relative low cost (compared to other types of rectifiers) and simple implementation. For example, the diode bridge employs four (4) or more diodes arranged in a bridge configuration. However, diode bridges may consume up to three and half percent (3.5%) of the total input power due to voltage drops across the diodes.

Active bridge rectifiers may be employed to reduce the power loss as described above. The active bridge rectifier may include up to sixty-seven (67) components. For example, the active bridge rectifier may include driver circuitry to assist with potential back-powering issues. Thus, the active bridge rectifier requires a greater amount of circuit board space, as well as incurring additional costs to design and to fabricate as compared to the diode bridge.

Thus, a semi-active bridge for furnishing voltage of a correct polarity to a powered device in a Power over Ethernet (PoE) network is disclosed. In one or more implementations, each phase of the semi-active bridge includes a diode having an anode portion and a cathode portion. The anode portion of the diode is connected to an input terminal, and the cathode portion of the diode is connected to an output terminal. The semi-active bridge also includes active transistor devices having a source region and a drain region. In one or more embodiments, the active transistor device may be an n-type FET device or a p-type FET device. For an n-type-FET, the source region of the active transistor device is connected to the input terminal, and the drain region of the active transistor device is connected to the output terminal. For a p-type-FET, the drain region of the active transistor device is connected to the input terminal, and the source region of the active transistor device is connected to the output terminal.

Example Implementations

Figure 1A:
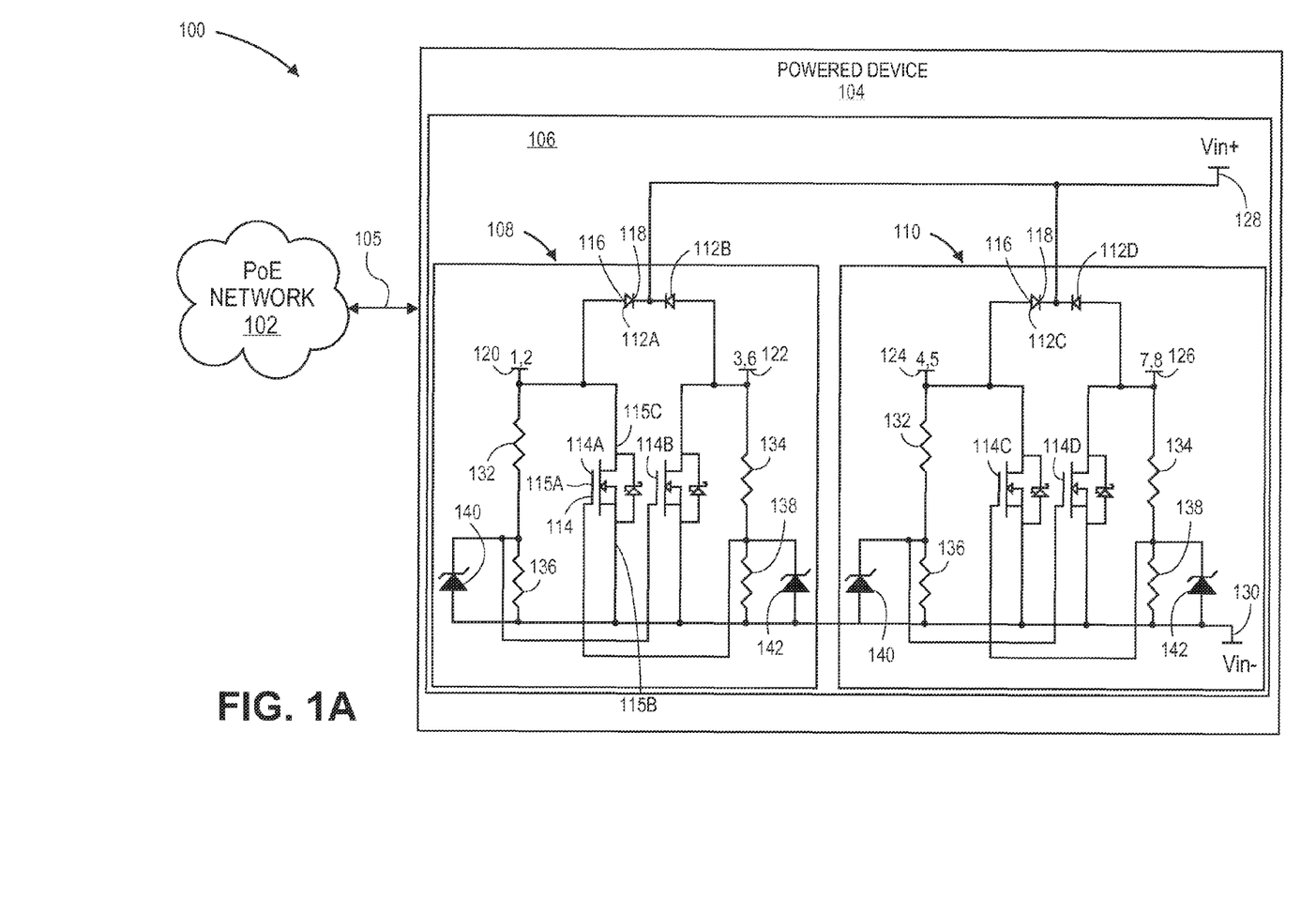
FIG. 1A is an example environmental diagram illustrating a Power over Ethernet (PoE) network configured to power a powered device, wherein the powered device includes two semi-active bridges in accordance with an example implementation of the present disclosure, where every phase in each semi-active bridge includes at least one diode and at least one active transistor device.

FIG. 1A illustrates an example system 100 in accordance with the present disclosure. The system 100 includes a Power over Ethernet (PoE) network 102 that is configured to deliver electrical power and data to a powered device 104. The PoE network 102 may provide electrical power and data to the powered device 104 via a Power over Ethernet communication interface 105. In a specific implementation, the communication interface comprises an Ethernet cable having modular connecters (e.g., an 8 Position 8 Contact [8P8C] connector, or the like). The powered device 104 may comprise any powered device configured for use in a PoE network. Examples include, but are not limited to: a wireless access point, an Internet Protocol (IP) telephone, an IP camera, combinations thereof, and so forth. The PoE network 102 may include power-sourcing equipment configured furnish (source) power to the powered device 104 via the communication interface 105 (e.g., Ethernet cable). In a specific implementation of the present disclosure, the data may be furnished to the powered device 104 via a first delivery mode of operation (e.g., differential mode), and the power may be furnished to the powered device 104 via a second delivery mode of operation (e.g., common mode).

The powered device 104 includes two semi-active bridges 106 (e.g., two bridge rectifiers) that is configured to provide electrical voltage with the correct polarity to the powered device 104. FIGS. 1A through 1D illustrates example implementations of the semi-active bridges 106. As shown in FIG. 1A, the semi-active bridges 106 includes a first bridge portion 108 and a second bridge portion 110. Each phase in the bridge portions 108, 110 include at least one diode 112 and at least one active transistor device 114. In an implementation, as shown in FIGS. 1A through 1D, the active transistor device 114 is a field-effect-transistor (FET) device, such as a metal-oxide-semiconductor field-effect-transistor (MOSFET) device. However, other types of active transistor devices may be utilized as well. For example, the active transistor device 114 may be a bipolar transistor (BJT) device, a junction field effect transistor (JFET) device, a gallium nitride transistor (GaNFET) device, an insulated gate bipolar transistor (IGBT) device, or the like. The diode 112 is configured to at least substantially allow current to at least substantially pass in one direction (from the anode portion 116 of the diode 112 to the cathode portion 118 of the diode 112). With respect to the FET devices 114, a voltage applied to a gate electrode 115A of the device 114 may induce a conducting channel between a source region 115B and a drain region 115C of the device 114. The conducting channel may allow current to pass from the source region 115B to the drain region 115C when a sufficient voltage is applied between the source region 115B and the drain region 115C. In embodiments, the FET device 114 may be an n-type MOSFET device (see FIGS. 1A and 1B) or a p-type MOSFET device (see FIGS. 1C and 1D). As shown, the FET devices 114 include a body diode 117 (intrinsic to the FET devices 114) between the source region 115B and the drain region 115C of the FET devices 114. The body diode 117 includes an anode portion 117A and a cathode portion 117B. When an n-type FET device 114 is utilized in the semi-active bridge 106 (see FIG. 1B), the anode portion 117A of the body diode 117 is coupled to source region 115B, and the cathode portion 117B of the body diode 117 is coupled to the drain region 115C. When a p-type FET device 114 is utilized in the semi-active bridge 106 (see FIG. 1D), the anode portion 117A of the body diode 117 is coupled to drain region 115C, and the cathode portion 117B of the body diode 117 is coupled to the source region 115B.

The semi-active bridges 106 is connected to the PoE network 102 through multiple input terminals 120, 122, 124, 126. In an implementation, the input terminals 120, 122, 124, 126 each represent a connector pair of a modular connector. For example, as shown in FIG. 1A, the terminal 120 represents connector pair 1,2 of an 8P8C connector. In another example, the terminal 122 represents connector pair 3,6 of the 8P8C connector. In yet another example, the terminal 124 represents connector pair 4,5 of the 8P8C connector. In another example, the terminal 126 represents connector pair 7,8 of the 8P8C connector. Thus, the terminals 120, 122, 124, 126 may each represent a data pair. In an implementation, the connector pairs may represent RJ-45 connector contacts.

The input terminals 120, 122, 124, 126 are also configured to receive voltage (e.g., direct current [DC] voltage, etc.) from the PoE network 102. In an implementation, a first voltage source (DC voltage source) may be connected to terminals 120, 122 of the semi-active bridges 106. For example, the positive terminal of the first voltage source may be connected to the terminal 120, and the negative terminal of the first voltage source may be connected to the terminal 122. However, it is contemplated that in some implementations the terminals (e.g., positive, negative) of the voltage source may be switched. In another implementation, a second voltage source may be connected to the terminals 124, 126 of the semi-active bridge 106. For example, the positive terminal of the second voltage source may be connected to the terminal 124, and the negative terminal of the second voltage source may be connected to the terminal 126. However, it is contemplated that in some implementations the terminals (e.g., positive, negative) of the voltage sources may be interchanged with the respective terminals 120, 122, 124, 126 of the semi-active bridges 106.

Figure 1B:
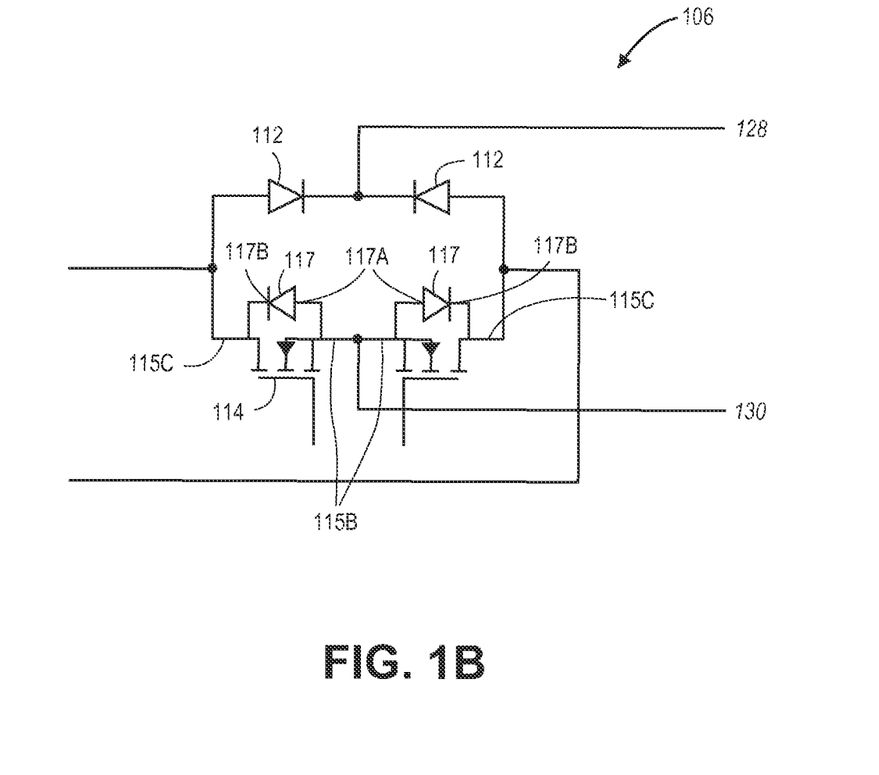
FIG. 1B is a circuit diagram of the semi-active bridge in accordance with another example implementation of the present disclosure as illustrated in FIG. 1A.

The terminals 120, 122, 124, 126 are also connected to the components (e.g., diode 112, FET device 114) of the semi-active bridges 106. In an implementation, as shown in FIGS. 1A and 1B, the terminal 120 is connected to the anode portion 116 of the diode 112A and drain region 115C (e.g., cathode portion 117B of the body diode 117) of the FET device 114A. The terminal 122 is connected to the anode portion 116 of the diode 112B and drain region 115C (e.g., cathode portion 117B of the body diode 117) of the FET device 114B. The terminal 124 is connected to the anode portion 116 of the diode 112C and drain region 115C (e.g., cathode portion 117B of the body diode 117) of the FET device 114C. The terminal 126 is connected to the anode portion 116 of the diode 112D and drain region 115C (e.g., cathode portion 117B of the body diode 117) of the FET device 114D.

The semi-active bridges 106 is configured to provide voltage of a correct polarity to the powered device 104 through differential output terminals 128, 130 (Vin+ and Vin−, respectively) of the bridges 106. For example, as described above, a voltage source (e.g., through the PoE network 102) may be connected to at least one pair of terminals (e.g., terminals 120, 122 or terminals 124, 126) of the semi-active bridges 106. The cathode portions 118 of the diodes 112 are connected to the output terminal 128, and the source regions 115B (e.g., anode portions 117A of the body diode 117) of the FET devices 114 are connected to the output terminal 130. While operational, the semi-active bridges 106 ensures that the voltage is of the correct polarity for powering the powered device 104 by furnishing voltage of the correct polarity to the differential output terminals 128, 130. In turn, the output terminals 128, 130 furnish the voltage to the powered device 104. In an implementation, the differential output terminals 128, 130 furnish a DC output voltage based upon the DC input voltage to the semi-active bridges 106. For example, the DC input voltage may be about forty-eight volts (48 VDC), and the semi-active bridge 106 is configured to furnish about forty-eight volts (48 VDC), in the correct polarity, to the powered device 104.

As shown in FIG. 1A, the bridge portions 108, 110 may further include multiple resistive components. As shown, each bridge portion 108, 110 includes one or more resistive components 132, 134, 136, 138 and Zener diodes 140, 142. The resistive components 132, 134, 136, 138 and the Zener diodes 140, 142 serve to provide control voltage of $V_{GS}$ to each respective FET device 114 of the counterpart phase. For example, the resistive components 132, 136, being connected between terminal 120 and terminal 130, generate a divider and the corresponding middle point is connected to 115A of the FET device 114B. The Zener diode 140 is to clamp the $V_{GS}$ of 114B in the event the input voltage across terminal 120 and terminal 122 experience a high transient voltage. As shown, the resistive components 134, 138 are connected between terminal 122 and terminal 130 to also generate a divider. It is contemplated that various resistive values may utilized in accordance with various implementations of the present disclosure. For example, the resistive values of the resistive components 132, 134 may be at least approximately the same resistive value, and the resistive values of the resistive components 136, 138 may be at least approximately the same resistive value. In another example, the resistive values of the resistive components 132, 134, 136, 138 may be at least approximately the same resistive value. In an implementation, the resistive components 132, 136 are connected in series to respective terminals within each bridge portion 108, 110 (i.e., resistive components 132, 136 are connected to the terminal 120 in bridge portion 108 and the resistive components 132, 136 are connected to the terminal 124 in bridge portion 110), and the resistive components 134, 138 are connected in series to respective terminals within each bridge portion 108, 110 (i.e., resistive components 134, 138 are connected to the terminal 122 in bridge portion 108 and the resistive components 134, 138 are connected to the terminal 126 in bridge portion 110). The diode 140 is connected in parallel with the resistive component 136 (e.g., the anode portion of the diode 140 is electrically connected to the output terminal 130; the cathode portion of the diode 140 is electrically connected at the node defined between the resistive components 132, 136). The diode 142 is connected in parallel with the resistive component 138 (e.g., the anode portion of the diode 142 is electrically connected to the output terminal 130; the cathode portion of the diode 142 is electrically connected at the node defined between the resistive components 132, 136).

Figure 1C:
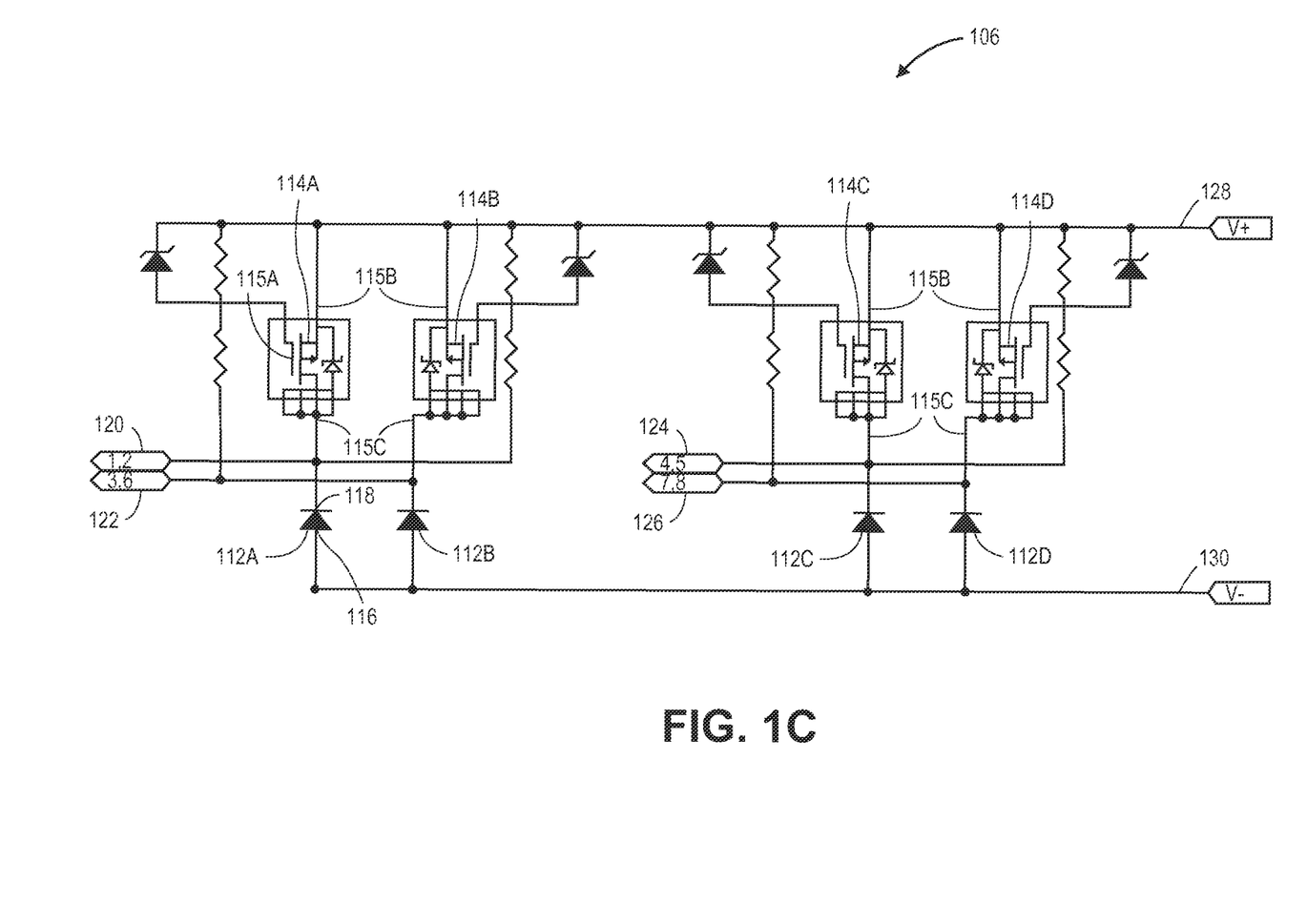
FIG. 1C is a circuit diagram of the semi-active bridges in accordance with another example implementation of the present disclosure, where the active transistor device is a p-type FET device.
Figure 1D:
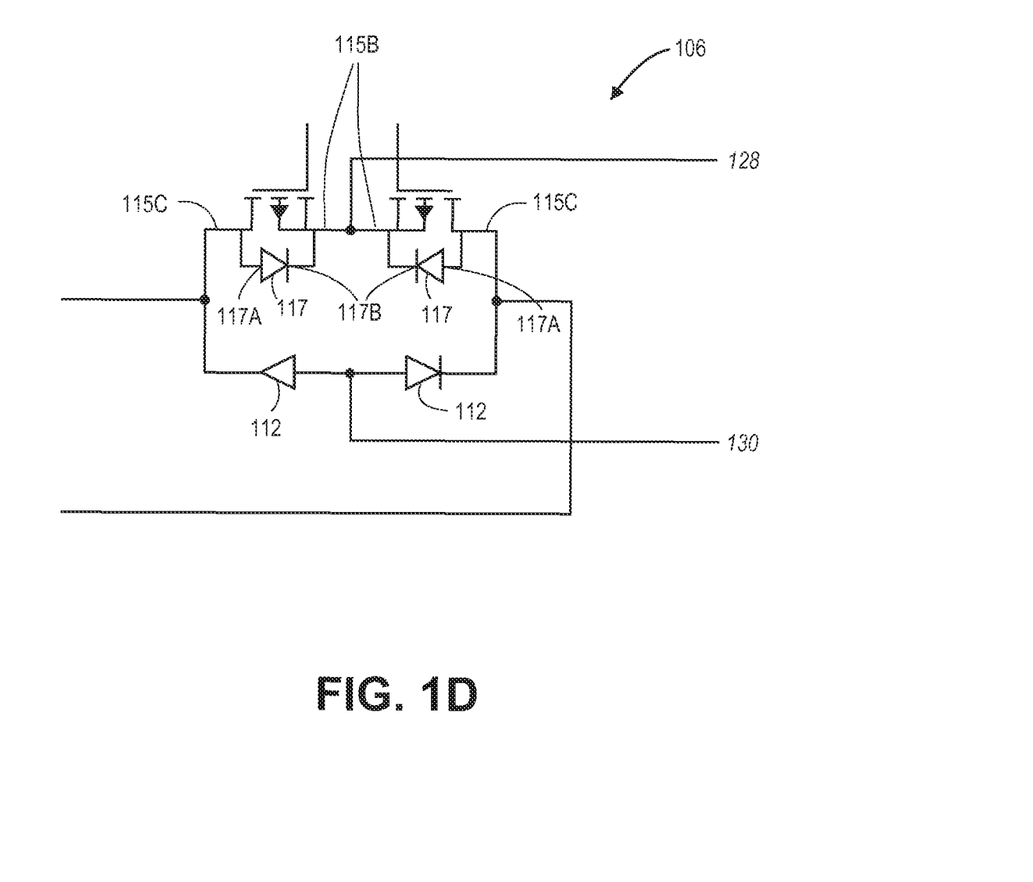
FIG. 1D is a circuit diagram of the semi-active bridge in accordance with another example implementation of the present disclosure as illustrated in FIG. 1C.

FIGS. 1C and 1D illustrate another implementation of the semi-active bridges 106. In this implementation, the FET devices 114 are p-type FET devices (PFET). As shown, the cathode portion 118 of the diodes 112 are connected to the input terminals. For example, the terminal 120 is connected to the cathode portion 118 of the diode 112A and the drain region 115C (e.g., anode portion 117A of the body diode 117) of the FET device 114A. The terminal 122 is connected to the cathode portion 118 of the diode 112B and the drain region 115C (e.g., anode portion 117A of the body diode 117) of the FET device 114B. The terminal 124 is connected to the cathode portion 118 of the diode 112C and the drain region 115C (e.g., anode portion 117A of the body diode 117) of the FET device 114C. The terminal 126 is connected to the cathode portion 118 of the diode 112D and the drain region 115C (e.g., anode portion 117A of the body diode 117) of the FET device 114D. Output terminal 128 is connected to each source region 115B (e.g., cathode portions 117B of the body diode 117) of the PFET devices (e.g., FET devices 114A, 114B, 114C, 114D), and output terminal 130 is connected to the anode portions 116 of each diode 112 (e.g., diodes 112A, 112B, 112C, 112D).

The semi-active bridges 106 described within the present disclosure includes at least one active transistor device in each phase. Thus, it is understood that other semi-active bridges 106 configurations are possible. For example, a semi-active bridge may include one (1) diode 112 and three (3) FET devices 114. In another example, a semi-active bridge may include three (3) diodes 112 and one (1) FET device 114.

Figure 2:
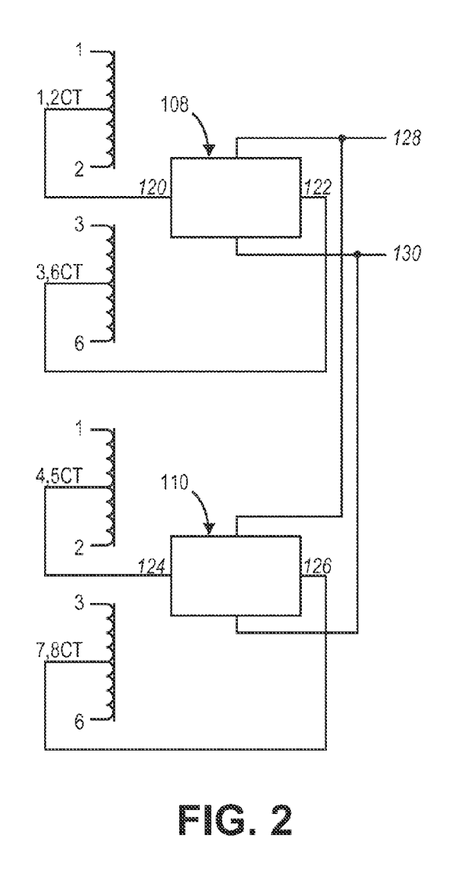
FIGS. 2 and 3 illustrate example connection configurations that interface with the semi-active bridge of the present disclosure.

FIG. 2 illustrates a possible connection configuration for the semi-active bridges 106. The terminals 120, 122, 124, 126 are connected through a center tap connection configuration. For example, the center tap connection is made approximately at a point half way along a winding (e.g., a magnetic winding) within a local area network (LAN) associated with the PoE network 102. In an implementation, as shown in FIG. 2, the terminal 120 includes a center tap connection to connector pair 1,2 (e.g., 1,2 CT). The terminal 122 includes a center tap connection to connector pair 3,6 (e.g., 3,6 CT). The terminal 124 includes a center tap connection to connector pair 4,5 (e.g., 4,5 CT). Finally, the terminal 126 includes a center tap connection to connector pair 7,8 (e.g., 7,8 CT).

Figure 3:
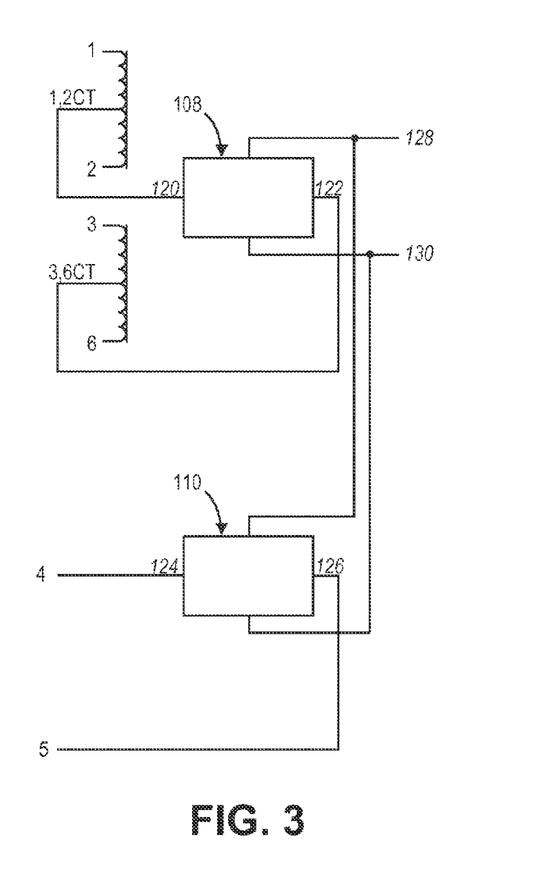

FIG. 3 illustrates another possible connection configuration for the semi-active bridge 106. In this implementation, the terminal 120 includes a center tap connection to connector pair 1,2 (e.g., 1,2 CT). The terminal 122 includes a center tap connection to connector pair 3,6 (e.g., 3,6 CT). The terminal 124 is connected to connector 4, and the terminal 126 is connected to connector 5 (e.g., connector pair 4,5). However, one skilled in the art will recognize that other connection configurations are possible.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A semi-active bridge for providing voltage of a correct polarity to a powered device, the semi-active bridge comprising:
   a first non-active bridge portion comprising a first discrete diode including an anode portion and a cathode portion, the anode portion directly connected to a first input terminal and the cathode portion directly connected to a first output terminal, wherein the first discrete diode is not in parallel with a respective switch;
   a first active bridge portion comprising a first active transistor device including a source region, a gate, and a drain region, the drain region directly connected to the first input terminal and the source region directly connected to a second output terminal, the second output terminal different from the first output terminal;

a first resistive divider connected in parallel with the first active transistor device, the first resistive divider comprising a first resistive component and a second resistive component electrically connected to define a first middle point, the first resistive component directly connected to the anode portion of the first discrete diode, to a first connector pair of a Power over Ethernet modular connector, and to the drain region of the first active transistor device, and the second resistive component directly connected to the source region of the first active transistor device;

a first Zener diode connected in parallel with the second resistive component and electrically connected to the first middle point;

a second non-active bridge rectifier portion comprising a second discrete diode including an anode portion and a cathode portion, the anode portion directly connected to a second input terminal and the cathode portion directly connected to the first output terminal, wherein the second discrete diode is not in parallel with a respective switch;

a second active bridge rectifier portion comprising a second active transistor device including a source region, a gate, and a drain region, the drain region directly connected to the second input terminal and the source region directly connected to the second output terminal;

a second resistive divider connected in parallel with the second active transistor device, the second resistive divider comprising a third resistive component and a fourth resistive component electrically connected to define a second middle point, the third resistive component directly connected to the anode portion of the second discrete diode, to a second connector pair of the Power over Ethernet modular connector, and to the drain region of the second active transistor device, and the fourth resistive component directly connected to the source region of the second active transistor device; and a second Zener diode connected in parallel with the fourth resistive component and electrically connected to the second middle point, wherein the gate of the first active transistor is electrically connected to the second middle point, and the gate of the second active transistor is electrically connected to the first middle point, wherein the first non-active bridge portion, the first active bridge portion, the second non-active bridge portion, and the second active bridge portion are arranged in the rectifier configuration.

2. The semi-active bridge as recited in claim 1, wherein the first output terminal and the second output terminal comprise an output differential pair configured to provide an output DC voltage of the correct polarity based upon an input DC voltage provided between the first input terminal and the second input terminal.

3. The semi-active bridge as recited in claim 1, wherein the first active transistor device comprises a metal-oxide-semiconductor field-effect-transistor (MOSFET) device.

4. The semi-active bridge as recited in claim 3, wherein the metal-oxide-semiconductor field-effect-transistor device comprises an n-type field-effect transistor device.

5. The semi-active bridge as recited in claim 1, wherein the first input terminal comprises the first connector pair of the Power over Ethernet modular connector.

6. A system comprising:

a powered device communicatively connected to a power over Ethernet network via a communication interface, the powered device including at least one semi-active bridge for providing voltage of a correct polarity to the powered device, the at least one semi-active bridge comprising:

a first non-active bridge portion comprising a first discrete diode including an anode portion and a cathode portion, the anode portion directly connected to a first input terminal and the cathode portion directly connected to a first output terminal, wherein the first discrete diode is not in parallel with a respective switch;

a first active bridge portion comprising a first active transistor device including a source region, a gate, and a drain region, the drain region directly connected to the first input terminal and the source region directly connected to second output terminal, the second output terminal different from the first output terminal;

a first resistive divider connected in parallel with the first active transistor device, the first resistive divider comprising a first resistive component and a second resistive component electrically connected to define a first middle point, the first resistive component directly connected to the anode portion of the first discrete diode, to a first connector pair of a Power over Ethernet modular connector, and to the drain region of the first active transistor device, and the second resistive component directly connected to the source region of the first active transistor device;

a first Zener diode connected in parallel with the second resistive component and electrically connected to the first middle point;

a second non-active bridge portion comprising a second discrete diode including an anode portion and a cathode portion, the anode portion directly connected to a second input terminal and the cathode portion directly connected to the first output terminal, wherein the second discrete diode is not in parallel with a respective switch;

a second active bridge rectifier portion comprising a second active transistor device including a source region, a gate, and a drain region, the drain region directly connected to the second input terminal and the source region directly connected to the second output terminal;

a second resistive divider connected in parallel with the second active transistor device, the second resistive divider comprising a third resistive component and a fourth resistive component electrically connected to define a second middle point, the third resistive component directly connected to the anode portion of the second discrete diode, to a second connector pair of the Power over Ethernet modular connector, and to the drain region of the second active transistor device, and the fourth resistive component directly connected to the source region of the second active transistor device; and a second Zener diode connected in parallel with the fourth resistive component and electrically connected to the second middle point, wherein the gate of the first active transistor is electrically connected to the second middle point, and the gate of the second active transistor is electrically connected to the first middle point, the first Zener diode configured to clamp a gate-to-source voltage of the gate of the second active transistor and the second Zener diode configured to clamp a gate-to-source voltage of the gate of the first active transistor, wherein the first non-active bridge portion, the first active bridge portion, the second non-active bridge portion, and the second active bridge portion are arranged in the rectifier configuration.

7. The system as recited in claim 6, wherein the first output terminal and the second output terminal comprise an output differential pair configured to provide an output DC voltage of the correct polarity based upon an input DC voltage provided between the first input terminal and the second input terminal.

8. The system as recited in claim 6, wherein the first active transistor device comprises a metal-oxide-semiconductor field-effect-transistor (MOSFET) device.

9. The system as recited in claim 6, wherein the first input terminal comprises the first connector pair of the Power over Ethernet modular connector.

\* \* \* \* \*